United States Patent [19]

Feldman et al.

[11] Patent Number: 5,661,585
[45] Date of Patent: *Aug. 26, 1997

[54] PASSIVE OPTICAL NETWORK HAVING AMPLIFIED LED TRANSMITTERS

[75] Inventors: Robert D. Feldman, Middletown; Kang-Yih Liou, Holmdel, both of N.J.

[73] Assignee: Lucent Technologies Inc., Murray Hill, N.J.

[*] Notice: The term of this patent shall not extend beyond the expiration date of Pat. No. 5,623,363.

[21] Appl. No.: 387,306

[22] Filed: Feb. 27, 1995

[51] Int. Cl.$^6$ .......................... H04B 10/04; H04B 10/00; H04J 14/08
[52] U.S. Cl. ..................... 359/180; 359/121; 359/137; 359/168; 359/344; 372/6
[58] Field of Search ...................... 359/120, 121, 359/124, 125, 136–137, 180, 341, 344, 168; 385/49; 372/6

[56] References Cited

U.S. PATENT DOCUMENTS

| | | | |
|---|---|---|---|
| 5,005,212 | 4/1991 | Wood | 455/606 |
| 5,221,983 | 6/1993 | Wagner | 359/120 |
| 5,311,344 | 5/1994 | Bohn et al. | 359/125 |
| 5,414,549 | 5/1995 | Nishimura et al. | 359/344 |

OTHER PUBLICATIONS

Shiuzawa et al, "Upstream–FDMA/Downstream–TDM Optical Fiber Multiaccess Network", *Journal of Lightwave Technology*, vol. 11, No. 5/6, May/Jun. 1993 pp. 1034–1039.
Kilkelly et al, "Experimental demonstration of a three channel WDM system . . . ," *Electronics Letters*, vol. 26, No. 20, Sep. 1990.
Goldberg, "High Power Superluminescent diode source", *Electronics Letters*, 29 Sep. 1994, vol. 30, No. 20, pp. 1682–1684.
Bar–Chain et al, "Integrated Optoelectronics", IEEE Spectrum, May 1982, pp. 38–44.

"Demonstration of a Cost–Effective, Broadband Passive Optical Network System", T. H. Wood et al., *IEEE Photonics Technology Letters*, vol. 6, No. 4, Apr. 1994, pp. 575–578.
"Reduction of Optical Beat Interference in SCM/WDMA Networks Using Pseudorandom Phase Modulation", M. N. Banat et al., *Journal of Lightwave Technology*, vol. 12, No. 10, Oct. 1994, pp. 1863–1868.
"High Speed, Burst–Mode, Packet–Capable Optical Receiver and Instantaneous Clock Recovery For Optical Bus Operation", Y. Ota et al., *Journal of Lightwave Technology*, 12, 1994, pp. 325.
"Operation of a Passive Optical Network With Subcarrier Multiplexing In the Presence of Optical Beat Interference", T. H. Wood et al., *Journal of Lightwave Technology*, vol. 11, No. 10, Oct. 1993, pp. 1632–1640.
"450 Mbit/s BPSK and 1 Gbit/s QPSK Throughout Subcarrier Multiple–Access Networks using 790 nm Selfpulsating Laser Transmitter Network For Computer Applications", R.J.S. Bates, *Electronics Letters*, vol. 27, No. 12, Jun. 6, 1991, pp. 1014–1016.
Bellcore Ref. TR–NWT–000909, "Generic Requirements and Objectives For Fiber In the Loop System", Dec. 1991, p.2–25.
Co–pending United States Patent Application Serial No. 08/395,219, filed Feb. 27, 1995, entitled "Semiconductor Light Source Having A Spectrally Broad, High Power Optical Output", (K–Y Liou 9).

*Primary Examiner*—Leo Boudreau
*Assistant Examiner*—Bhavesh Mehta
*Attorney, Agent, or Firm*—Steven R. Bartholomew; Stuart H. Mayer

[57] ABSTRACT

A lightwave communication system includes an optical distribution system for routing optical signals and a plurality of optical transmitters coupled to the optical distribution system. At least one of the optical transmitters has an amplified light emitting diode for generating an optical spectrum. At least one optical receiver is optically coupled to the optical distribution system.

8 Claims, 8 Drawing Sheets

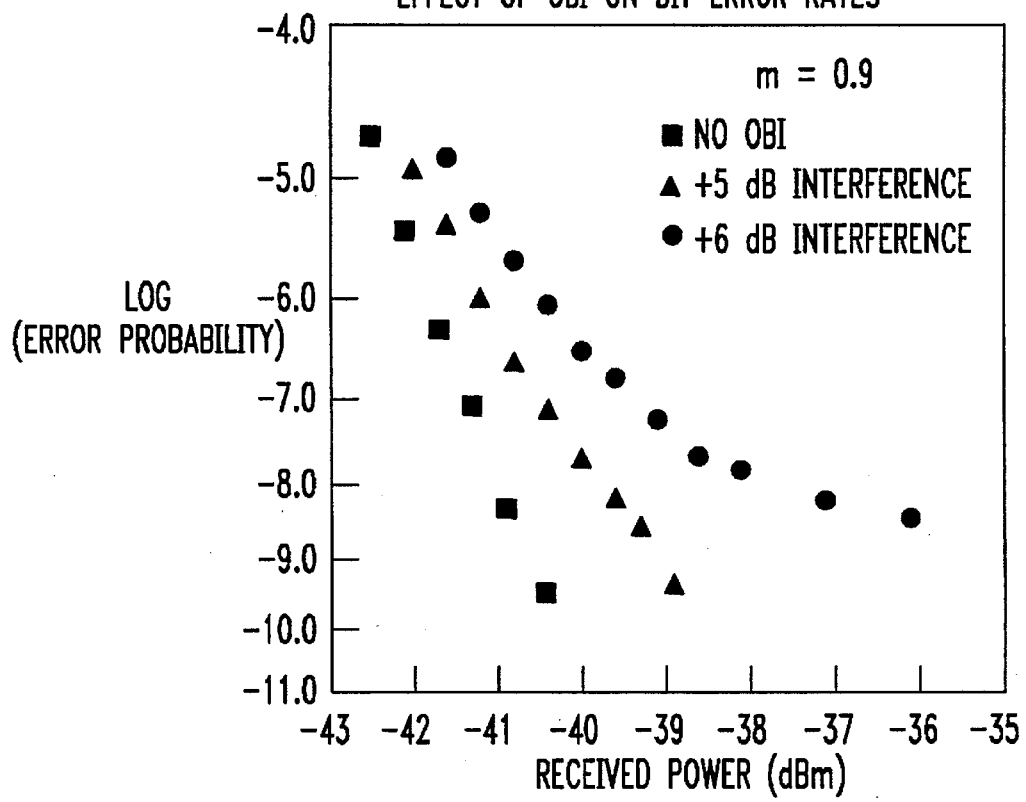
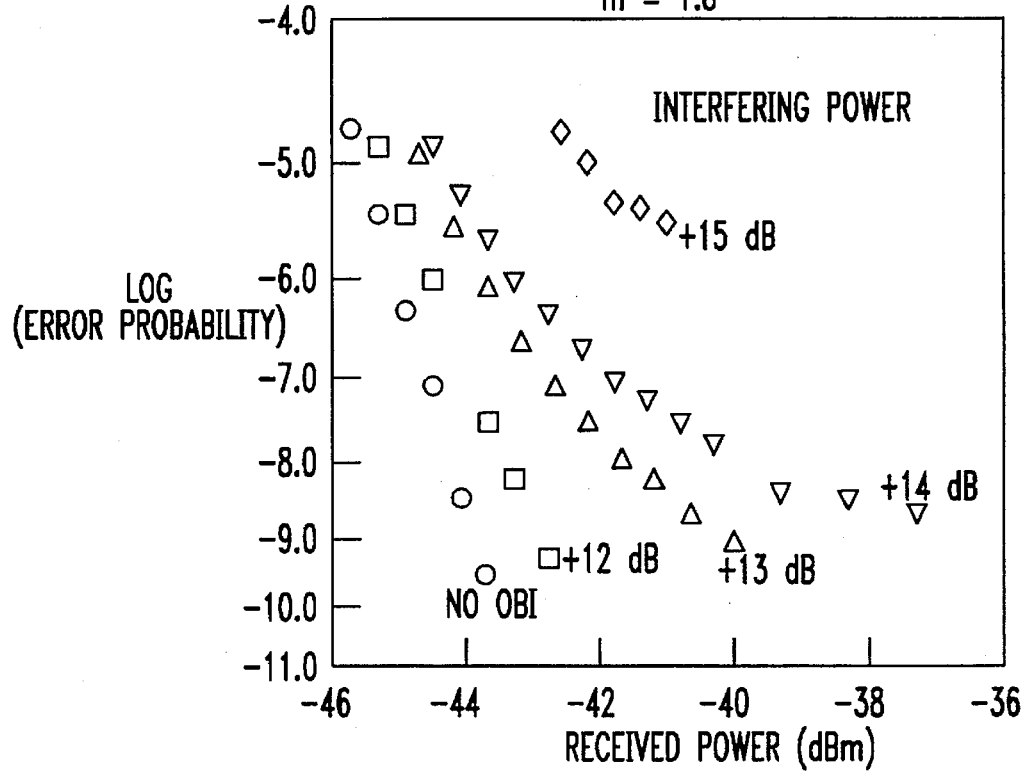

"EMBH"

PASSIVE OPTICAL NETWORK HAVING AMPLIFIED LED TRANSMITTERS

TECHNICAL FIELD

This invention relates to lightwave transmission systems and, more particularly, to a passive optical network having transmitters that employ amplified light emitting diodes (LEDs).

BACKGROUND OF THE INVENTION

The deployment of optical fiber in the telephone access network has recently been accelerating. One of the more popular architectures uses a passive optical network (PON). The current generation of PONs is intended to be upgradeable to broadband service delivery. Any such upgrade must deliver transmission rates suitable for a realistic set of target services at the lowest possible cost. One such cost-effective broadband PON architecture that incorporates coarse wavelength division multiplexing (WDM) to separate upstream and downstream traffic, time division multiplexing (TDM), and subcarrier multiple access (SCMA) is described in our article "Demonstration of a Cost-Effective, Broadband Passive Optical Network System," *IEEE Photonics Technology Letters*, Vol. 6, No. 4, pp. 575–578, April 1994, and U.S. Pat. No. 5,311,344 which issued on May 10, 1994 to T. H. Wood and P. P. Bohn.

SCMA transmission systems are attractive for several reasons. They use simple radio techniques, require no synchronization, can be designed to make little demand on laser linearity, and can be scaled to very high bit rates. However, SCMA systems can suffer from optical beat interference (OBI), which adversely effects system performance by increasing the noise transmitted on the data channels. This problem is exacerbated when laser transmitters are employed since the narrow optical spectrum of the lasers increases the impairment that the system experiences from OBI.

There have been a number of experimental and theoretical attempts to broaden the optical spectra to limit the penalty caused by OBI. A broader optical spectrum leads to a broader spectrum for the beat note, thus resulting in less optical beat noise within a given electrical bandwidth. Attempts to broaden the optical spectrum of lasers include the use of self-pulsating lasers (see R. J. S. Bates et al., Electron. Lett. 27, 1014, 1991) and modulating lasers with a modulation index greater than one (see T. H. Wood et al., J. Lightwave Technol. 11, 1632, 1993). A theoretical investigation has described the use of external modulators to broaden the spectrum through optical phase modulation. (see M. N. Banat et al., J. Lightwave Technol. 12, 1863, 1994). All of these techniques have significant limitations. Self-pulsating lasers are not readily available at optical communications wavelengths, and in any case their reliability is unknown. By using an optical modulation index greater than one the power consumption increases. Moreover, the power of the transmitting lasers may still require adjustment to ensure that the powers received from each laser by the optical detector are all nearly equal. Moreover, the external modulators are prohibitively expensive.

Light emitting diodes (LED) would otherwise be an attractive solution to the problem of OBI except that too little of their power can be coupled into a single mode fiber. The inherently broad optical spectrum of an LED should make OBI penalties negligible, and LED technology is well-established and reliable. For example, Bellcore suggests a loss budget of 24.4 dB for a PON with a 16-way split (see Bellcore reference TR-NWT-000909 entitled "Generic Requirements and Objectives for Fiber in the Loop Systems, ", December, 1991, p. 2–25). Such PONs are required to operate with a bit error rate below $10^{-9}$. The received power level required to achieve this bit error rate level will depend on the subcarrier modulation format and the bit rate. For example, the inventors have determined that a 3 Mb/s frequency-shift-keyed subcarrier data stream has been found to require a received power level of −38 dBm. Consequently, the power launched into the fiber by the LED must be greater than −13.6 dBm. LEDs must be able to provide this power level over the lifetime of the PON at temperatures that may be as high as 85° C. No available LEDs can meet such a demanding requirement. Moreover, as lightwave transmission systems increase their bit rates, the power requirements will also increase. Accordingly, the limited power of LEDs becomes even more problematic.

SUMMARY OF THE INVENTION

In accordance with the present invention, a lightwave communication system includes an optical distribution system for routing optical signals and a plurality of optical transmitters coupled to the optical distribution system. At least one of the optical transmitters has an amplified light emitting diode for generating an optical spectrum. At least one optical receiver is optically coupled to the optical distribution system. Accordingly, in contrast to prior lightwave transmission systems such as SCMA transmission systems, the present invention overcomes OBI by employing a light source that has both adequate power and a broad optical spectrum.

BRIEF DESCRIPTION OF THE DRAWING

FIGS. 8 and 9 show the effect of OBI on bit error rates for an arrangement similar to that shown in FIG. 5 but with the amplified LED replaced by a laser.

DETAILED DESCRIPTION

Figure 1:
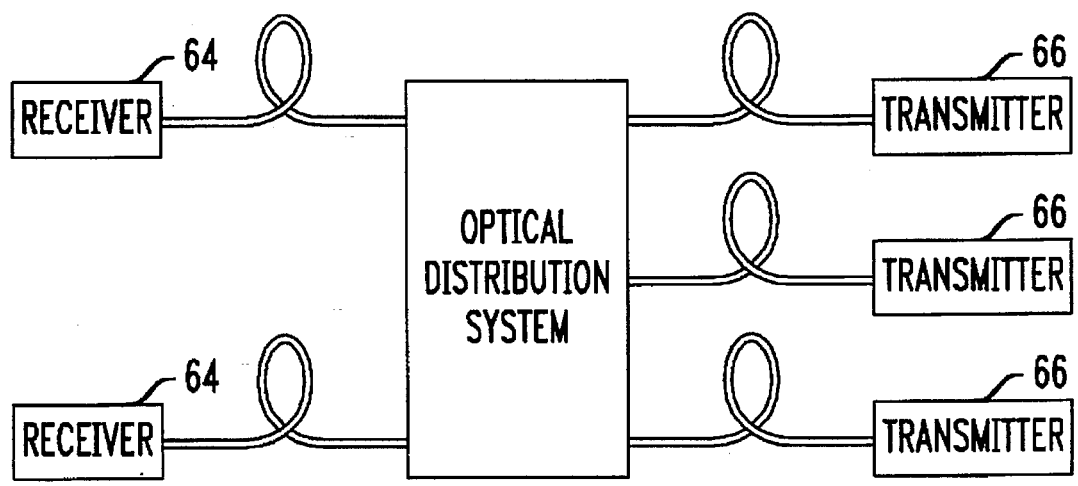
FIG. 1 shows an illustrative simplified block diagram of a lightwave transmission system.

FIG. 1 shows an illustrative simplified diagram of a lightwave transmission system. The transmission system includes an optical distribution system 62 that receives optical signals from one or more transmitters 66 and directs them to one or more receivers 64. Each transmitter typically incorporates a laser that operates within a predefined wavelength window that meets the system specifications. Lasers are used because in contrast to other light sources such as conventional LEDs, lasers are designed so that there is efficient coupling of their output into a single mode fiber. In practice, the individual receivers and transmitters are often replaced by a single transceiver that provides both transmitting and receiving functions.

The optical distribution system 62 serves to optically couple the transmitters to the receivers by appropriate routing of the optical wavelengths. The distribution system may include such passive components as couplers, splitters, and wavelength division multiplexing (WDM) devices, as well as optical fiber and connectors. Active devices such as optical amplifiers and wavelength-shifting devices may also be employed in the distribution system 62.

Figure 2:
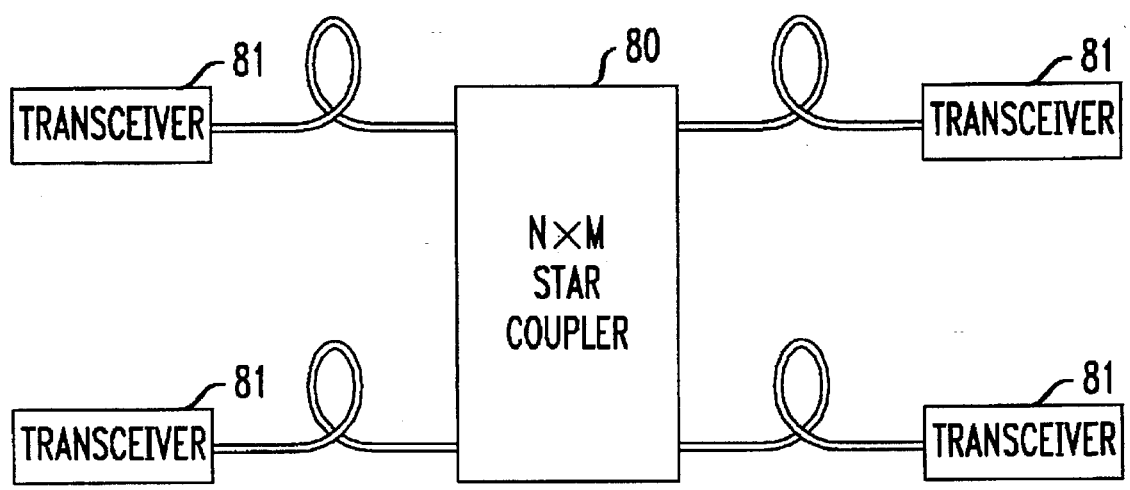
FIG. 2 shows a simplified diagram of lightwave transmission system that employs a star coupler.
Figure 3A:
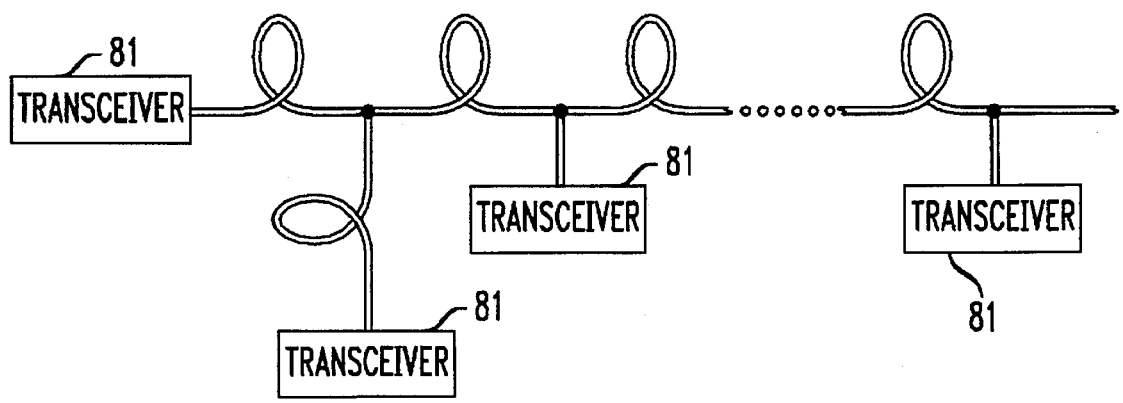
FIGS. 3(*a*) and 3(*b*) show a simplified diagram of a lightwave transmission system arranged as a bus network and a ring network, respectively.
Figure 3B:
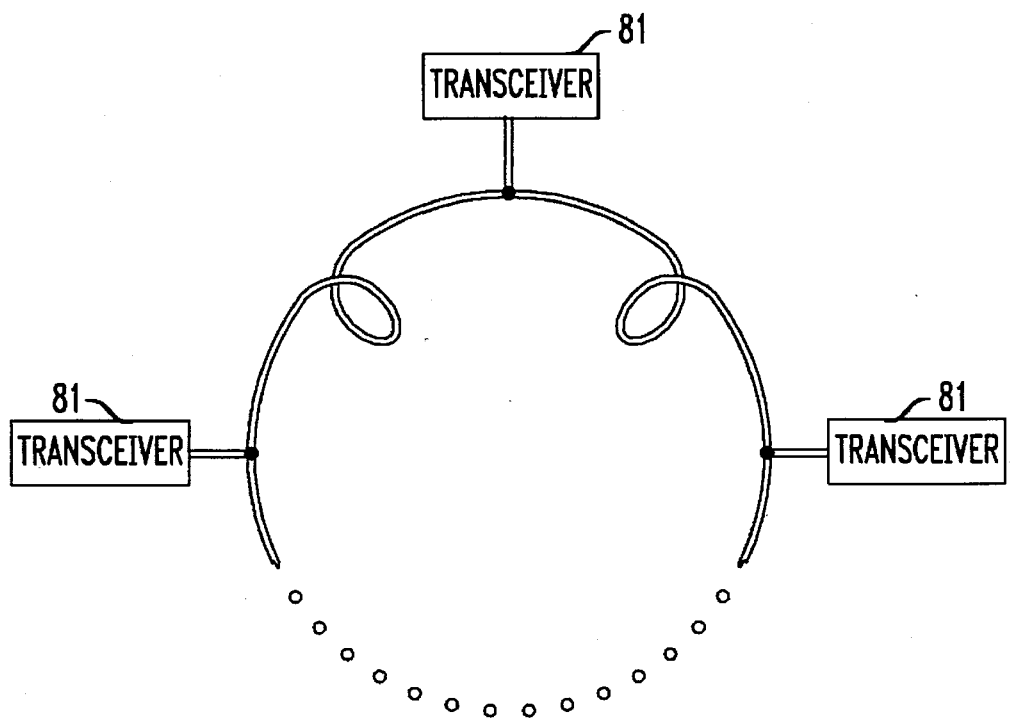

FIG. 2 shows a simplified diagram of a lightwave transmission system in which a star coupler 80 serves as the optical distribution system. In this and all other figures, like reference numerals refer to like components. The individual transmitters, receivers, and transceivers 81 are each coupled to a different port of the star coupler 80. FIG. 3(a) and 3(b) show examples of other system architectures in which a bus serves as the optical distribution system. The system in FIG. 3(a) is referred to as a bus network while the system in FIG. 3(b) is referred to as ring network. As one of ordinary skill in the art will recognize, numerous other transmission system architectures employing a great variety of different optical distribution systems are possible and all are contemplated within the scope of the present invention.

One particular type of lightwave transmission system is known as a passive optical network for deploying optical fiber in the subscriber loop. Such systems sometimes use a "fiber to the home or curb" (FTTH or FTTC) architecture, where one or more transport optical fibers connect an exchange or central office at the head end terminal (HDT) of the network to an optical distribution system containing only passive components (e.g., star couplers) serving optical network units (ONUs) at the remote end of the network. A number of strategies have been proposed to govern communication between the subscriber and the exchange or central office. Most proposed multiple access strategies involve the use of a single multiplexing technique such as time-division multiple access (TDMA), wavelength-division multiple access (WDMA), or subcarrier multiple access (SCMA).

Passive optical networks that are currently being installed offer narrowband services sufficient to provide voice telephony service (64 kb/s per line) only. The multiple access technique used in these first generation PONs is TDMA, in which each ONU located at the remote end of the network and serving one or more individual subscribers transmits to the central office (or remote terminal) in its own time slot. Multiple access in a PON is difficult because variations in optical loss budgets and launch power lead to large variations in the optical power received in the central office from each of the ONUs. In addition, there are large differences in path lengths between the various ONUs and the central office, and these path lengths change with time due to thermal expansion and contraction. In a TDMA PON, the signals sent from the various ONUs must be carefully synchronized to ensure that they arrive at nonoverlapping times at the central office, and this synchronization must be readjusted continually. The problems associated with TDMA in a PON have been overcome for narrowband applications by using an advanced optical receiver design, such as disclosed in Y. Ota et at., "High-Speed, Burst-Mode, Packet-Capable Optical Receiver and Instantaneous Clock Recovery for Optical Bus Operation," J. Lightwave Technol. 12, 325(1994). Complex communications protocols have been introduced in TDMA PONs between the central office and the ONUs to further alleviate these problems. However, as the bit rates increase, the problems associated with TDMA PONS will become more difficult to solve, and alternative multiple access techniques may be preferable.

One alternative technique is wavelength division multiple access (WDMA), in which each ONU transmits a different wavelength. This approach is currently not economical for use in fiber-to-the-home or fiber-to-the-curb deployments because of the high cost of such components as single frequency lasers and wavelength routing devices.

In a third multiple access technique called subcarrier multiple access (SCMA), the current driving the laser in each ONU is modulated at a radio frequency known as the subcarrier frequency. Each ONU has a different subcarrier frequency assigned to it so that the signals can be separated in the central office using electrical bandpass filters following the optical receiver. If desired, more than one subcarrier frequency can be used by each ONU. Standard radio techniques, such as frequency, phase, or amplitude shift keying, are used to modulate the subcarrier at each ONU, and thus transmit data. The SCMA technique avoids the synchronization problems of TDMA networks. It can utilize low-cost radio frequency electronics, and therefore is more cost-effective than WDMA.

However, one problem that arises in lightwave transmission systems, particularly in SCMA PONs, is optical beat interference (OBI). OBI arises whenever two optical signals closely spaced in wavelength are simultaneously incident upon the same photodetector in one of the receivers. The beating of the two signals will produce an output at an electrical frequency equal to the frequency difference between the two signals. Noise will be added to the data channel if the frequency of the beat should fall within the electrical bandwidth of the data channel. OBI becomes a particularly significant problem in PONs that employ many transmitters closely spaced in wavelength. Moreover, the problem becomes particularly acute when using transmitters that emit a very narrow optical spectrum, which is typically the case when lasers are employed.

The adverse effects of OBI can be overcome by employing a transmitter having a light source with an inherently broad optical spectrum, in contrast to a laser, which has a narrow spectrum. While light emitting diodes (LEDs) offer a broad optical spectrum, until recently their output power was too low to be launched into a single mode fiber and hence they were impractical for PONs. However, an amplified LED that provides sufficiently high output power for use in a PON is disclosed in U.S. application Ser. No. 08/395, 219 by K. Y. Liou entitled Semiconductor Light Source Having a Spectrally Broad, High Power Optical Output, filed in the U.S. Patent and Trademark Office on the same date at the present application, which is hereby incorporated by reference. The peak wavelength of the amplified LED should be chosen to meet system requirements. For example, two wavelengths commonly employed in lightwave transmission systems are 1.3 and 1.55 microns.

Figure 4A:
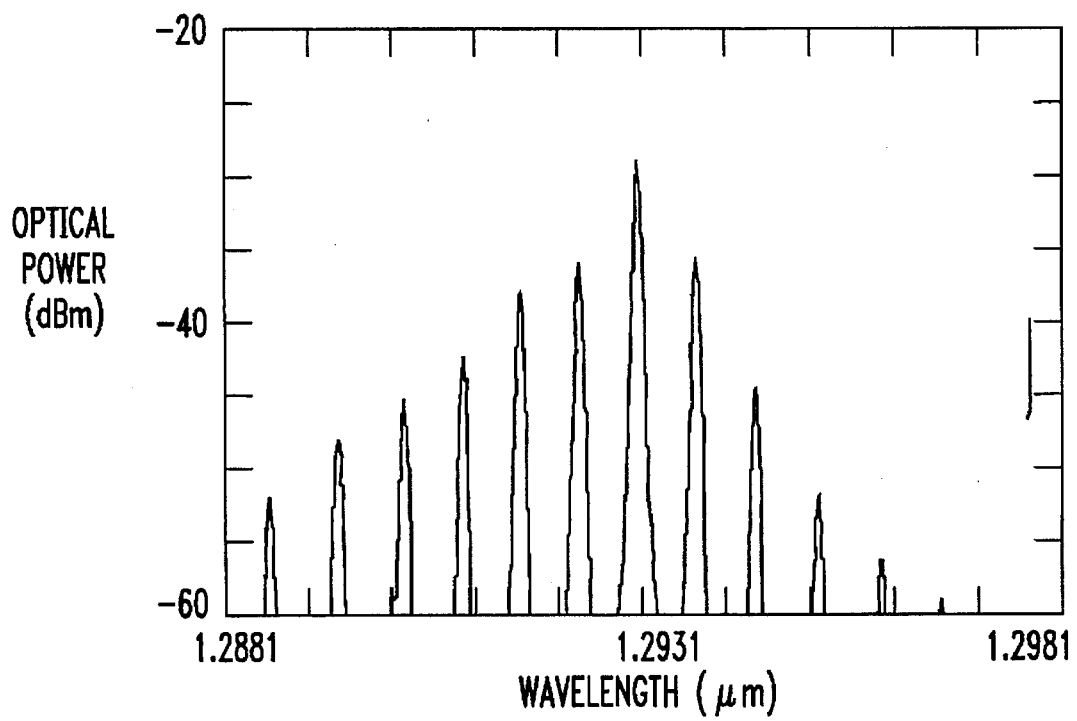
FIGS. 4(*a*) and 4(*b*) show the spectral output from a laser and an amplified LED, respectively.
Figure 4B:
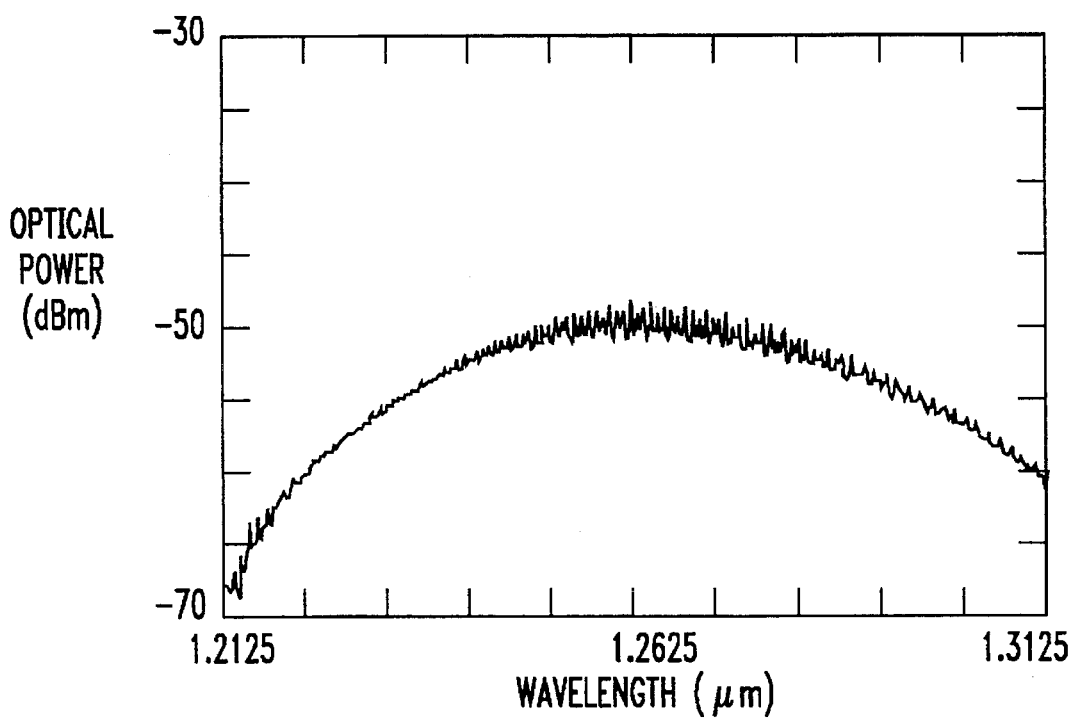

Amplified LEDs are distinct from both lasers and LEDs in a number of respects. For example, the output from a laser consists of discrete, relatively narrow longitudinal modes defined by the length of the laser cavity. In contrast an amplified LED has a relatively broad spectrum defined by the gain characteristics of the active material that is employed. FIG. 4(a) and FIG. 4(b) show the spectral output from an exemplary laser and amplified LED, respectively.

An amplified LED has a structure that differs from conventional LEDs. In particular, as discussed in the above-referenced patent application to Liou, an amplified LED includes an optically emissive section that defines a conventional LED and an amplifier section separate from the optically emissive section. An optical fiber or waveguide couples the optically emissive section to the amplifier section. In contrast, a conventional LED does not include a separate amplifier section. The amplified LED employed in the present invention should be able to adequately couple its optical output into a single mode fiber. The amplified LED shown in the previously-referenced patent application to Liou can operate in this fashion.

An amplified LED, referred to as a semiconductor light source in the aforementioned U.S. patent application Ser. No. 08/395,219, may be fabricated by optically coupling the output of an edge emitting LED to a single or transverse mode optical (STMO or MTMO) semiconductor amplifier using a suitable waveguide. If the amplified LED is implemented using an STMO amplifier, a single mode fiber may be employed to optically couple the amplifier and LED. If, on the other hand, an MTMO amplifier is utilized, a multi-mode optical fiber may be employed.

As indicated above, the peak wavelength of the amplified LED is chosen in accordance with the specific requirements of the application. Illustratively, the LED portion of the amplified LED may be configured as a commercially available single transverse mode LED having a peak output at 1.3 microns at a bias current of 30 mA. Due to semiconductor band filling, the peak output of such an LED shifts to 1.28 microns at a bias current of 60 mA. The LED may be operated in its superluminescent mode with some optical gain such that the half-power width of its optical output spectrum is maintained at about 600 angstroms. Typically, the aforementioned exemplary LED is packaged with a single mode fiber that may used to optically interconnect the LED with the amplifier in the manner noted above. For a more detailed discussion of the design and fabrication of LEDs which may be utilized in accordance with the teachings of the present invention, reference may be had to papers by B. D. Patterson et al., IEEE Journal of Quantum Electronics, Vol. 30, p. 703 (1994) and Kashima et al., Journal of Lightwave Technology, Vol. 10, no. 11, p. 1644 (1992), respectively.

A STMO amplifier which may be used to implement an amplified LED or semiconductor light source in accordance with the present invention may, by way of illustration, be fabricated from any single transverse mode semiconductor laser. Examples of appropriate laser structures are disclosed in M. J. O'Mahony, Journal of Lightwave Technology, Vol. 7, p. 1071 (1989). An antireflective coating is applied to the cleaved laser facets to suppress laser oscillations. The AR coating can be a dielectric layer of silicon dioxide, for example. The thickness of the dielectric layer is equal to one-quarter the wavelength of the light propagating in the structure. An active guide layer is sandwiched between upper, lower, and lateral cladding layers. Illustratively, the upper layer may be doped p-type while the lower layer is doped n-type. The lateral cladding layers serve as current blocking layers. The refractive index of the active guide layer is larger than the refractive index of the cladding layers. If the amplifier is to serve as an STMO amplifier, the thickness and width of the active layer should be small enough so that only the fundamental mode is guided.

As will be readily apparent to those skilled in the art, the optical gain spectrum of the amplifier is determined by the bandgap wavelength of the active guide layer. The amplifier itself should have a gain peak wavelength that matches the peak emission wavelength of the LED. By way of specific illustration, amplification of the exemplary LED described above may be achieved by an STMO amplifier having a gain spectrum centered at approximately 1.3 microns and formed from a channeled substrate buried heterostructure laser having a bulk active region. Of course, other amplifier structures may be employed such, for example, as capped mesa buried heterostructures. In any event, after coating both laser facets with an antireflective coating in the manner noted above, a structure with a peak gain wavelength of 1.255 microns—as determined by its spontaneous emission spectrum—can be achieved. While the reflectivity of the coating should, ideally, be zero, no substantial degradation in performance has been observed at reflectivities of about $10^{-3}$.

Figure 11A:
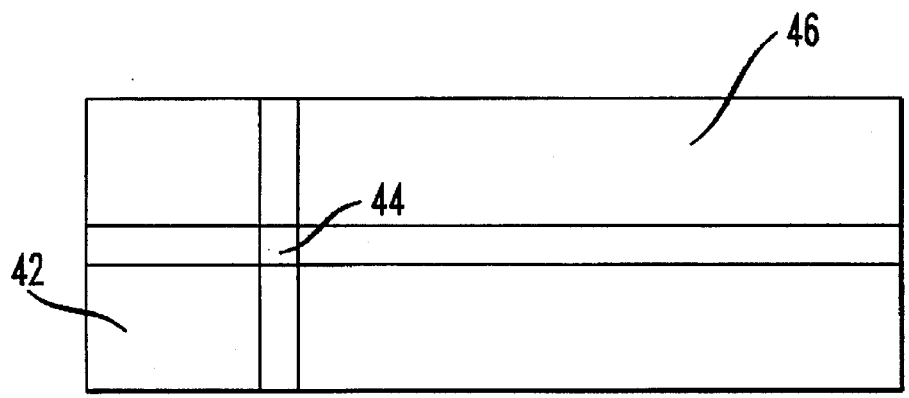
FIG. 11A depicts a monolithically integrated, amplified LED structure suitable for use as a light source in the optical transmitters of the inventive arrangement of FIG. 10.

It is also possible to configure the amplified LED or semiconductor light source employed by the present invention as a monolithically integrated device, as shown in FIG. 11A. As seen in FIG. 11A, the LED and amplifier portions are fabricated on a common substrate, the LED 142 being electrically isolated from the amplifier 146 so that the two active devices can be biased independently of one another. The output facet of the structure located adjacent to the amplifier should be provided with an AR coating. The facet located adjacent the LED may be provided with a partial AR coating or optical absorber, if desired. The LED and amplifier may be fabricated in any known structural configuration, including etched mesa buried heterostructures and channeled substrate buried heterostructures. Preferably, however, an integrated waveguide 144 is utilized to optically couple the LED and the amplifier.

A predetermined amount of optical loss is introduced into the integrated waveguide in order to reduce the coupling efficiency. Essentially, the degree of optical decoupling should approximate the optical loss which occurs between the LED and amplifier when they are fabricated as discrete components as, for example, in the previously described example. The optical decoupling should also be large enough to suppress laser oscillations, and its precise value is dependent on the internal efficiencies of the light source. For instance, an optical loss of approximately 6–8 dB has been found to be sufficient for long wavelength light sources operating at 1.3 and 1.55 microns. As will be readily ascertained by those skilled in the art, if no optical isolation were provided, the device would begin to oscillate and thereby exhibit the operating characteristics of a laser rather than an LED. Optical loss sufficient to achieve the requisite degree of optical decoupling may be introduced by any known means, such as by inserting an optical absorber between the LED and amplifier portions, or by providing the integrated waveguide with a y-branch coupler that removes a predetermined fraction of optical energy. As a further illustration, optical loss may be introduced by providing a mode mismatch between the LED and the amplifier sections to radiate away part of the power.

Figure 11B:
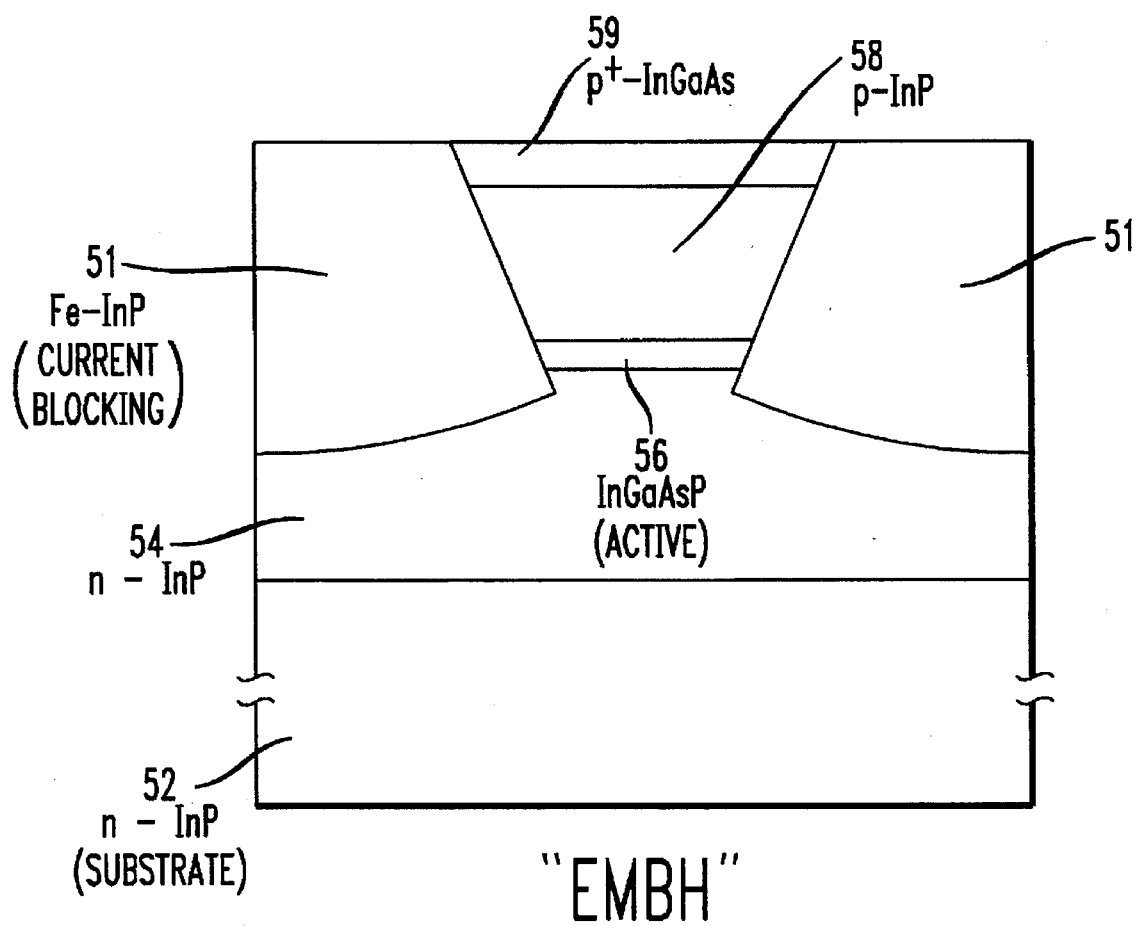
FIG. 11B is a cross-sectional view of an etched mesa buried heterostructure that may be employed in the illustrative amplified LED structure of FIG. 11B.

FIG. 11B shows a cross-sectional view of an etched mesa buried heterostructure that may be employed for both the LED 142 and the amplifier 146. The structure includes an n-InP substrate 152 on which an n-InP cladding layer 154 is deposited. A 0.2 micron thick InGaAsP active layer 156 is deposited on cladding layer 154 and a 1.7 micron thick p-InP cladding layer 158 is then deposited on the active layer 156. A 0.1 micron thick p-InGaAs contact layer 159 is deposited on the cladding layer 158. After the above layers have been deposited, the structure is etched down into the cladding layer 154 to form a waveguide mesa having a width of about 1.5 microns at the location of the active layer 156. The fabrication process is then continued by depositing an Fe-doped InP semi-insulating layer 151 on both sides of the waveguide mesa. The semi-insulating layer 151 provides both current blocking and optical confinement. Rather than Fe-doped InP, the layer 151 may be fabricated from n-p-n reverse-biased InP layers or a combination of both Fe-doped InP and n-p-n reverse biased InP layers. The structure is then thinned from the substrate side to a thickness of about 100 microns. Finally, the device is completed by applying appropriate electrical contacts to both surfaces of the device. To achieve electrical isolation, the LED 142 and amplifier 146 should be provided with separate contact pads on the P-side. In addition, the conductive layer 159 should be removed in the region between the LED and amplifier. Of course, additional electric isolation can be achieved by partially etching the portion of the cladding layer 158 located between the LED and amplifier without etching the underlying waveguide.

The active layer 156 may be fabricated as a bulk-like layer as indicated above or, alternatively, as a series of multiple quantum well layers. Because the optical gain of the device is polarization dependent, a bulk active layer is desirable since it reduces the polarization sensitivity. If the active layer 156 is used for the integrated waveguide 144 and no electrical current is applied to it, waveguide 144 becomes an absorber that provides the optical loss between LED 142 and amplifier 146. The optical loss is given by $e^{-\alpha L}$ where $\alpha$ is the absorption and L is the length of the waveguide 144. Alternatively, the active layer 156 and the coupling loss can be provided by a y-branch coupler or a mode mismatch in the waveguide region 144.

Figure 5:
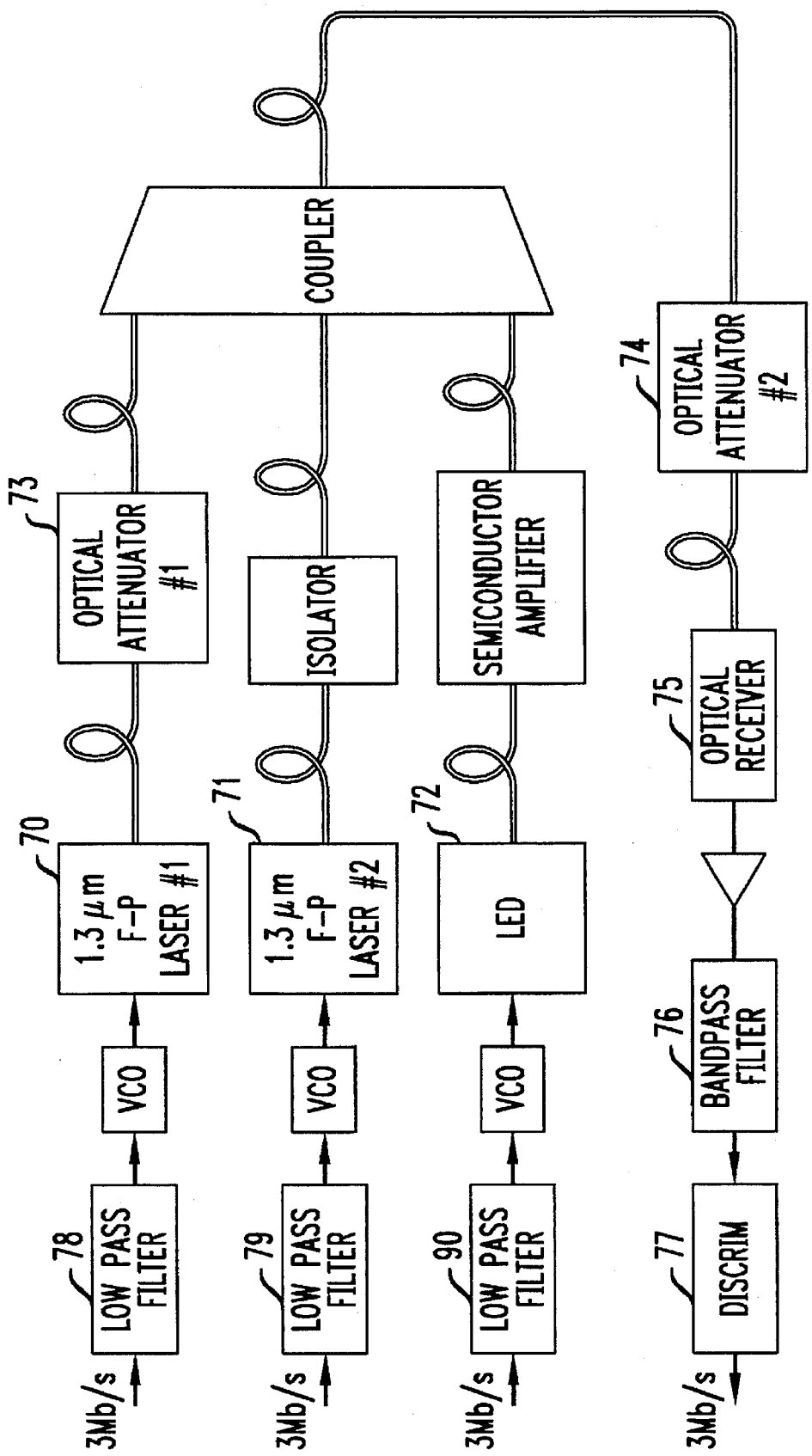
FIG. 5 shows an experimental arrangement that was used to illustrate the reduction in OBI that is achievable by employing an amplified LED.

FIG. 5 shows an arrangement that was used to demonstrate the reduction in OBI that can be achieved by employing an amplified LED rather than a laser transmitter. The arrangement uses three light sources 70, 71 and 72. Light sources 70 and 71 are lasers as in a conventional PON and light source 72 is an amplified LED such as disclosed in the previously-referenced patent application to Liou. Laser 70 carries a 3 Mb/s pseudorandom frequency-shift-keyed data stream on a subcarrier frequency of 120 Mhz. The light from laser 70 passes through a variable optical attenuator 73 before it is combined with the interfering optical signals from laser 71 and the amplified LED 72. Optical attenuator 73 is used to adjust the relative strength of the signal and interfering channels. An actual PON may have large variations in launch power and loss budgets between the various light sources and the optical receiver. The adverse effects of OBI will be most severe when the interference from two very strong light sources overlaps the subcarrier channel of a very weak source.

The combined optical signal is passed through variable optical attenuator 74 prior to reaching an optical receiver 75. The resulting electrical signal is amplified downstream from the receiver and then filtered by a filter 76 to select the signal channel. The signal is then demodulated with an FM discriminator 77. This arrangement avoids adjacent channel interference by using lowpass filters 78, 79 and 90 to limit the transmitted RF bandwidth of each channel, and a large channel spacing of 12 MHz is used. The lowpass filters employed were characterized by an 8-section, Bessel response, and a 1.8 Mhz 3-dB cutoff frequency. Isolators were placed downstream from the lasers 70 and 71 to prevent reflection-induced noise from contributing to any OBI penalties.

Figure 6:
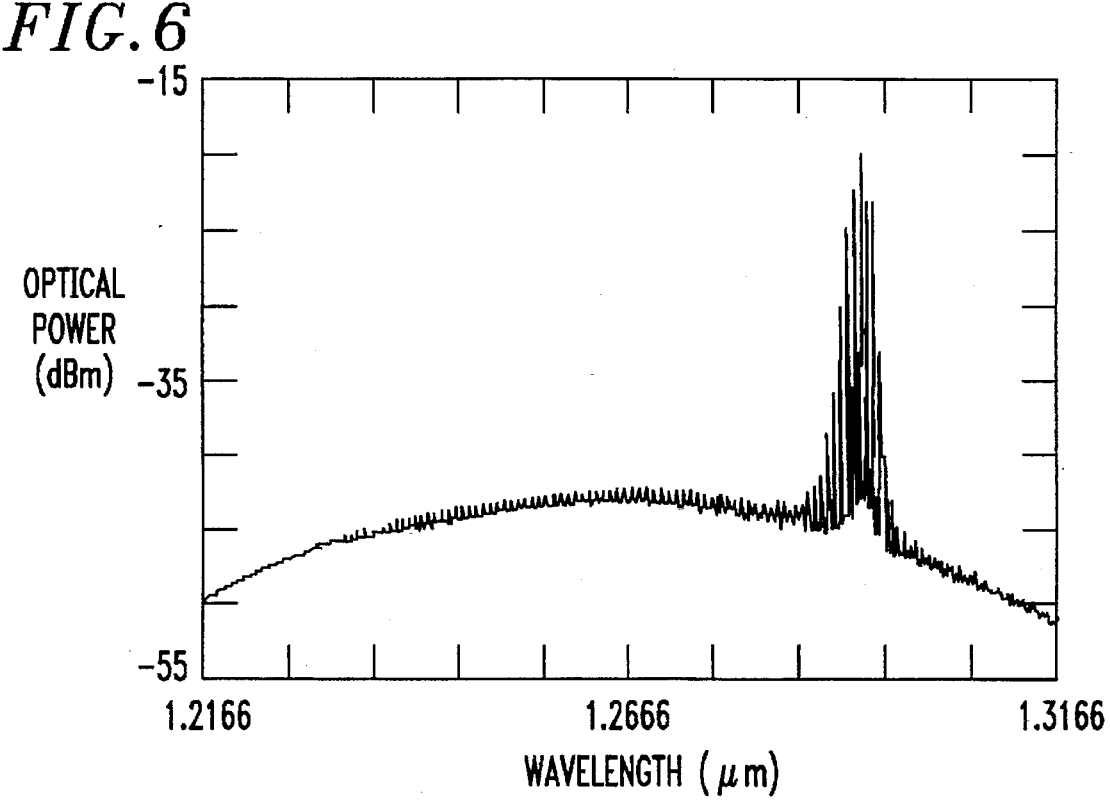
FIG. 6 shows the combined optical spectra from the amplified LED and one of the lasers shown in FIG. 5.

FIG. 6 shows the combined optical spectra from the amplified LED 72 and the laser 71. The amplified LED 72 has a 3 dB bandwidth of approximately 50 nm. The temperature of the laser 71 was maintained at 0° C. to shorten the laser wavelength so that it overlaps the spectrum of the amplified LED near the edge of the 3 dB bandwidth.

Figure 7:
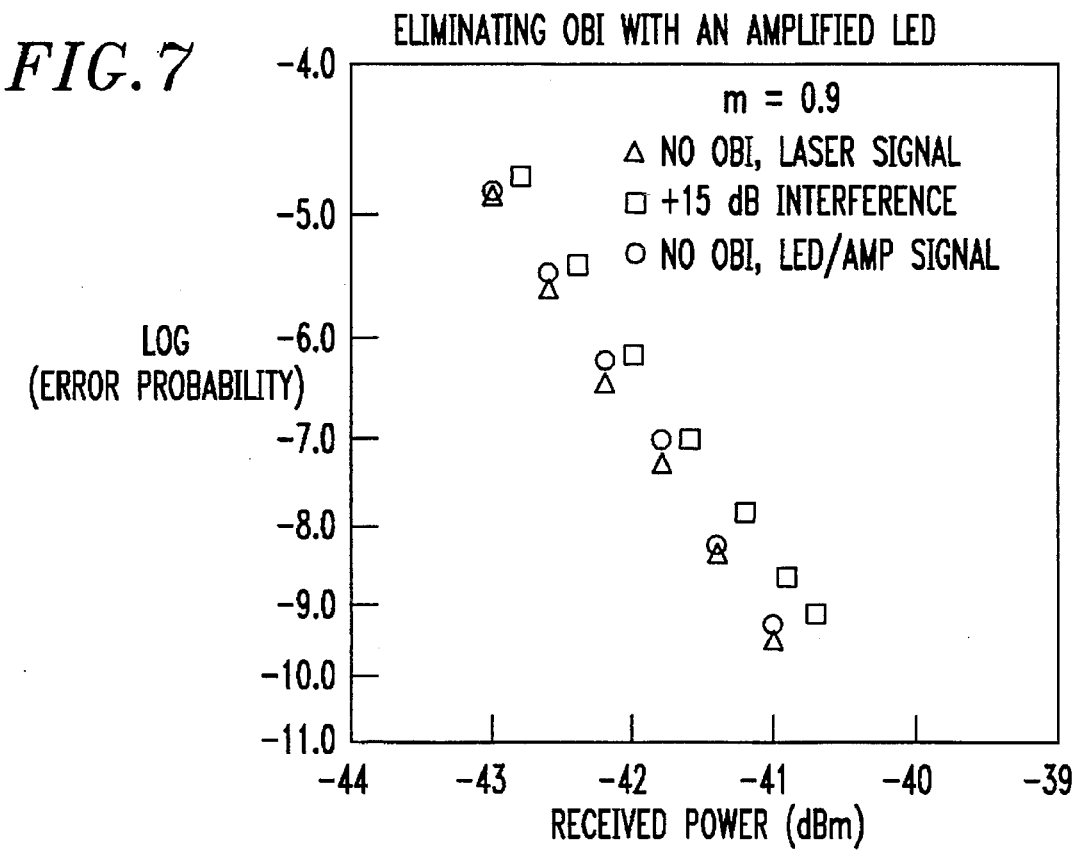
FIGS. 7 shows the bit error rate versus received power for various levels of interference.

FIG. 7 illustrates the bit error rate versus received power for three cases: no interference on the laser signal channel, 15 dB interference, and no interference on the amplified LED signal channel. FIG. 7 demonstrates that the penalty from beating laser source 71 with the amplified LED 72 is negligible, even when the combined interfering power is 15 dB stronger than the signal power. That is, the adverse effects of OBI have been effectively eliminated. Additional measurements were performed using the amplified LED 72 as the signal channel to show that it is a suitable source for an SCMA network such as discussed in greater detail below. The receiver sensitivity at a bit error rate of $10^{-9}$ shows no penalty from using the amplified LED instead of the laser.

FIGS. 8 and 9 show the effect of OBI on bit error rates for an arrangement similar to that shown in FIG. 5, but with the amplified LED 72 replaced by a laser as in a conventional PON. Under the conditions of apparent maximum OBI, for a typical optical modulation index of 0.9, the OBI penalty prevents operation of the network for an interference level only 6 dB stronger than the signal level. Using a very high modulation index value of 1.8 makes the system tolerant to an interference level of about 12 dB greater than the signal level. However, this approach does not achieve the same level of performance demonstrated above in which the amplified LED replaces the laser, in accordance with the present invention.

Figure 10:
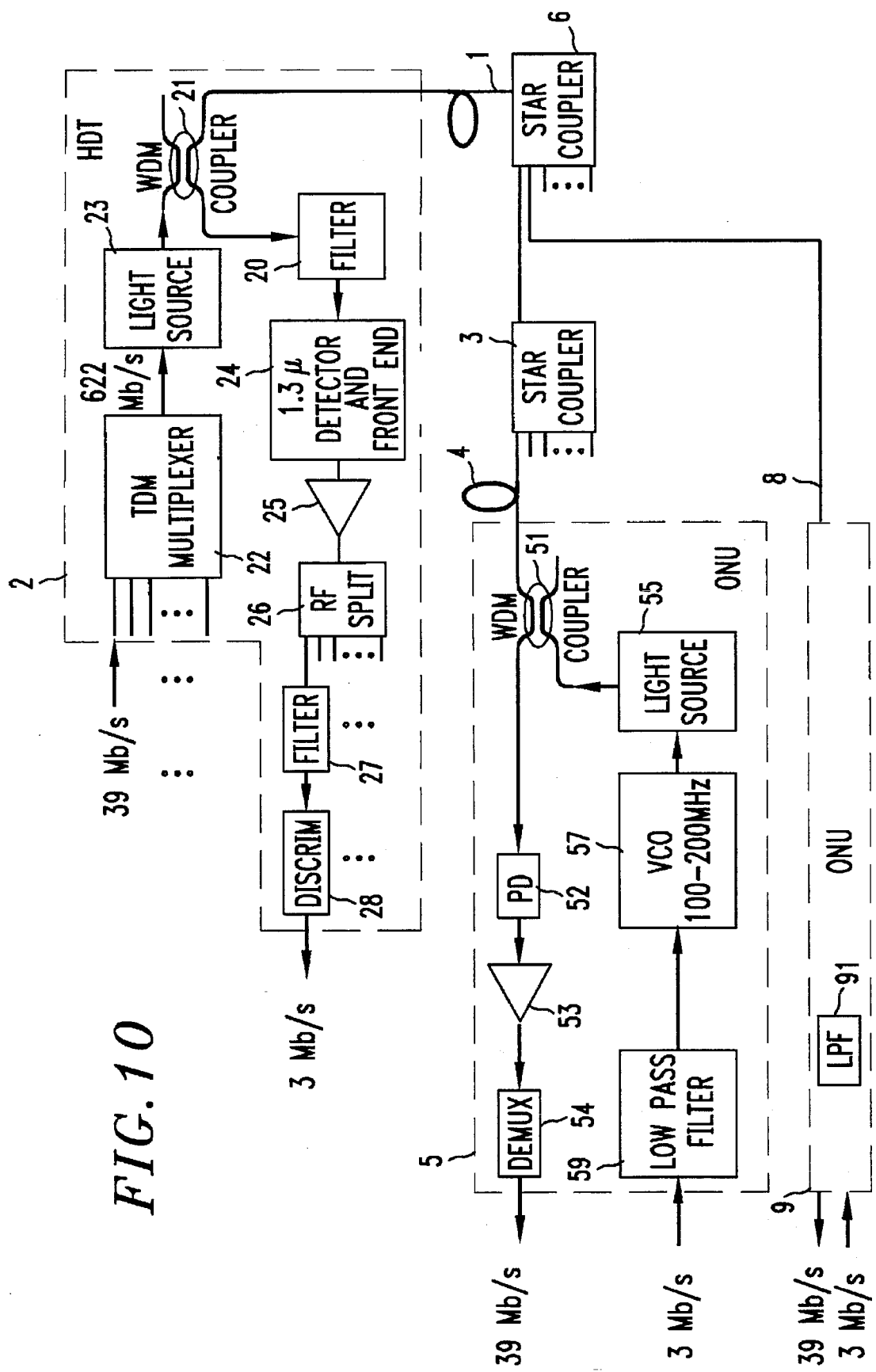
FIG. 10 shows a simplified diagram of an SCMA transmission system incorporating an amplified LED in accordance with the present invention.

While the present invention is applicable to any type of lightwave transmission system generally, and PON systems in particular, the following discussion will describe in greater detail the operation of an SCMA PON. SCMA systems offer several attractive features. FIG. 10 shows a SCMA system in which an exchange or central office at the head end terminal, e.g., HDT 2, of the network is connected by optical fiber to star couplers 3 and 6 serving ONUs (e.g., 5 and 9) at the remote end of the network. The illustrative PON of FIG. 10 provides 39 million bits per second (Mb/s) downstream to each of sixteen optical network units (ONUs). Each ONU illustratively transmits 3 Mb/s upstream to the head end terminal HDT 2.

In FIG. 10, an illustrative optical transport fiber 1 connects head end terminal HDT 2 with passive, wavelength-independent optical star couplers 3 and 6. The outbound and inbound transmission wavelengths are 1.5 μm and 1.3 μm, respectively. Short lengths of optical fiber 4 connect the outputs of the coupler 3 with respective distant subscriber terminals ONU 5 normally located on subscriber premises. Illustratively, each ONU receives a high-speed data signal (39 Mb/s) on the outbound service and transmits a moderately high-speed data signal (3 Mb/s) on the inbound service. It should be noted that each ONU can serve one or more subscribers.

The head end terminal HDT 2 includes an outbound service transmitter, an inbound service receiver, and a wavelength selective coupling element (WDM) 21 for connecting the service to and from the transport fiber. As such, the head end terminal operates as a transceiver. Wavelength selective coupling element 21 is used for launching the 1.5 μm wavelength band for outbound transmission, and for extracting the 1.3 μm wavelength band for inbound transmission. While FIG. 10 shows only one inbound service receiver, it should be noted that multiple receivers can be connected to fiber 1, each operating, for example, at different wavelengths.

Outbound service transmitter includes multiplexer 22 and light source 23. Outbound service is provided by time-division multiplexing sixteen 39 Mb/s baseband signals into a single 622 Mb/s baseband signal using multiplexer 22. Electro-optical conversion of this baseband signal is accomplished by directly modulating light source 23. External modulation of light source 23 is not shown in FIG. 10 but is contemplated for use therewith as a substitute for direct modulation. The output from light source 23 is optically coupled into wavelength selective coupler 21 wherein the outbound optical signal is coupled over to the coupler output port connected to transport fiber 1.

In prior SCMA systems, the light source 23 is often realized as a 1.5 μm distributed feedback (DFB) laser. In the present invention, this light source is either a laser or an amplified LED.

As described above, coupler 21 is also connected between the transport fiber 1 and the inbound service receiver. The inbound service receiver includes optical filter 10, photodetector 24, amplifier 25, RF power splitter 26, bandpass filters 27, and discriminators 28.

Optical filter 20 is used, if necessary, to remove any reflected optical signals outputted from coupler 21. Photodetector 24 converts the received inbound signal from filter 20 into an electrical signal which is then amplified by amplifier 25. The optical inbound signal, as will be discussed in more detail below, comprises a group of subcarrier multiplexed signals, one subcarrier per ONU, propagating in transport fiber 1. Splitter 26 has one input port and at least one output port corresponding to each ONU. Since there are sixteen ONUs in FIG. 1, the RF splitter has sixteen output ports. Splitter 26 distributes substantially equal amounts of the signal at the input port to each output port. From the splitter 26, the signals are frequency demultiplexed to recover the ONU signals which were previously subcarrier multiplexed. In this arrangement, bandpass filter 27 and discriminator 28 cooperate to recover a particular ONU signal. For example, the bandpass filter 27 is tuned to extract the signals from ONU 5. Bandpass filter 27 has a bandwidth of about 3 MHz. Discriminator 28 has a delay line discriminator for converting the received signals from frequency-shift keying (FSK) to amplitude-shift keying (ASK). Inbound service signals for a particular subscriber are output from discriminator 28.

The passive star couplers 3 and 6 connect at the remote end of the transport fiber 1. Star couplers 3 and 6 provide the dual functions of distributing signals to the subscriber terminals and combining signals from the subscriber terminals. Optical fibers 4 and 8 connect the star couplers 3 and 6, respectively, to the subscriber terminals ONUs 5 and 9, respectively. As shown, ONU 5 connects via two star couplers (3 and 6) while ONU 9 connects via one star coupler 6 to the head end terminal HDT 2.

Each subscriber terminal, e.g., ONU, includes an outbound service receiver, an inbound service transmitter, and a wavelength selective coupling element 51. As such, the subscriber terminal is a transceiver. Wavelength selective coupling element 51 is necessary for launching the wavelength band for inbound transmission, and for extracting the wavelength band for outbound transmission.

The outbound service receiver of ONU 5 includes photodetector 52, amplifier 53, and time-division multiplexer 54 for recovering the information from the time slots assigned to a corresponding subscriber. Photodetector 52, illustratively, is a Positive Intrinsic Negative (PIN) photodetector which converts the received, broadband, outbound service signal from the optical to the electrical domain. Amplifier 53, such as a GaAs transimpedance amplifier, increases the power in the signal output from the detector. Demultiplexer 54 provides the necessary time-division demultiplexing to recover the signal destined for the associated subscriber. That is, demultiplexer 54 in our example extracts one 39 Mb/s channel of the 622 Mb/s outbound signal sent from a head end terminal HDT 2.

The inbound service transmitter in each subscriber terminal, e.g., ONU 5, may include a low pass filter 59 to filter the subscriber's data input signal or an equalizer (as shown in U.S. Pat. No. 5,311,344) which is used as a high pass filter. Voltage-controlled oscillator 57 is tuned to a center frequency corresponding to the assigned subcarrier for the associated subscriber. The voltage-controlled oscillator 57 responds to the data at the subscriber terminal input to produce an FSK output at the designated subcarrier frequency. The FSK output signal is applied to a light source 55 for directly modulating the light source. In accordance with the present invention, light source 55 is realized as an amplified LED operating at 1.3 microns.

Many variants of the SCMA system described above are possible. For example, the wavelengths described in FIG. 10 for the wavelength division multiplexing can be reversed so that the outbound service is transmitted at a lower wavelength than the inbound service. In addition, the number of subscribers (ONUs) can be increased or decreased with the concomitant change in the number of terminals, the size of the star couplers, the multiplexing capability of multiplexer 22, and the number of demultiplexers in the inbound services receiver. The SCMA system may use binary signaling, or instead, groups of bits can be encoded into multilevel symbols, thereby achieving a higher data throughput rate.

We claim:

1. A lightwave communication system comprising:

an optical distribution system for routing optical signals;

a plurality of optical transmitters coupled to the optical distribution system, at least one of the optical transmitters having a semiconductor light source for generating an optical spectrum, said semiconductor light source including a light emitting diode and an optical amplifier optical coupled to the optically emissive section by an optical waveguide; and at least one optical receiver optically coupled to the optical distribution system, wherein the optical amplifier is one of a single mode transverse mode optical amplifier and a multiple mode transverse mode optical amplifier.

2. The system of claim 1 wherein each of the optical transmitters has said semiconductor light source for generating an optical spectrum.

3. The system of claim 1 wherein said optical distribution system comprises at least one star coupler.

4. The system of claim 1 wherein said optical distribution system comprises at least one element selected from the group consisting of wavelength division multiplexing devices, optical fiber, optical connectors, optical amplifiers, and wavelength-shifting devices.

5. The system of claim 1 wherein the semiconductor light source operates at a peak wavelength of about 1.3 microns.

6. The system of claim 1 wherein the semiconductor light source operates at a peak wavelength of about 1.55 microns.

7. A passive optical network comprising:

a plurality of optical transmitters for transmitting optical signals, at least one of said transmitters being a subcarrier modulated optical transmitter having a semiconductor light source for transmitting a modulated subcarrier signal;

a passive optical distribution system for routing said optical signals and said modulated subcarrier optical signal, said semiconductor light source including a light emitting diode and and an optical amplifier optically coupled to the optically emissive section by an optical waveguide; and an optical receiver for receiving one or more optical signals from the optical transmitters, wherein the optical amplifier is one of a single mode transverse mode optical amplifier and a multiple mode transverse mode optical amplifier.

8. The optical network of claim 7 wherein each of the plurality of subcarrier modulated optical transmitters utilize frequency shift key modulation.

* * * * *